July 22, 1941.                G. W. SCHATZMAN                2,250,136
                                  FENDER SHIELD
                              Filed April 24, 1939              3 Sheets-Sheet 1
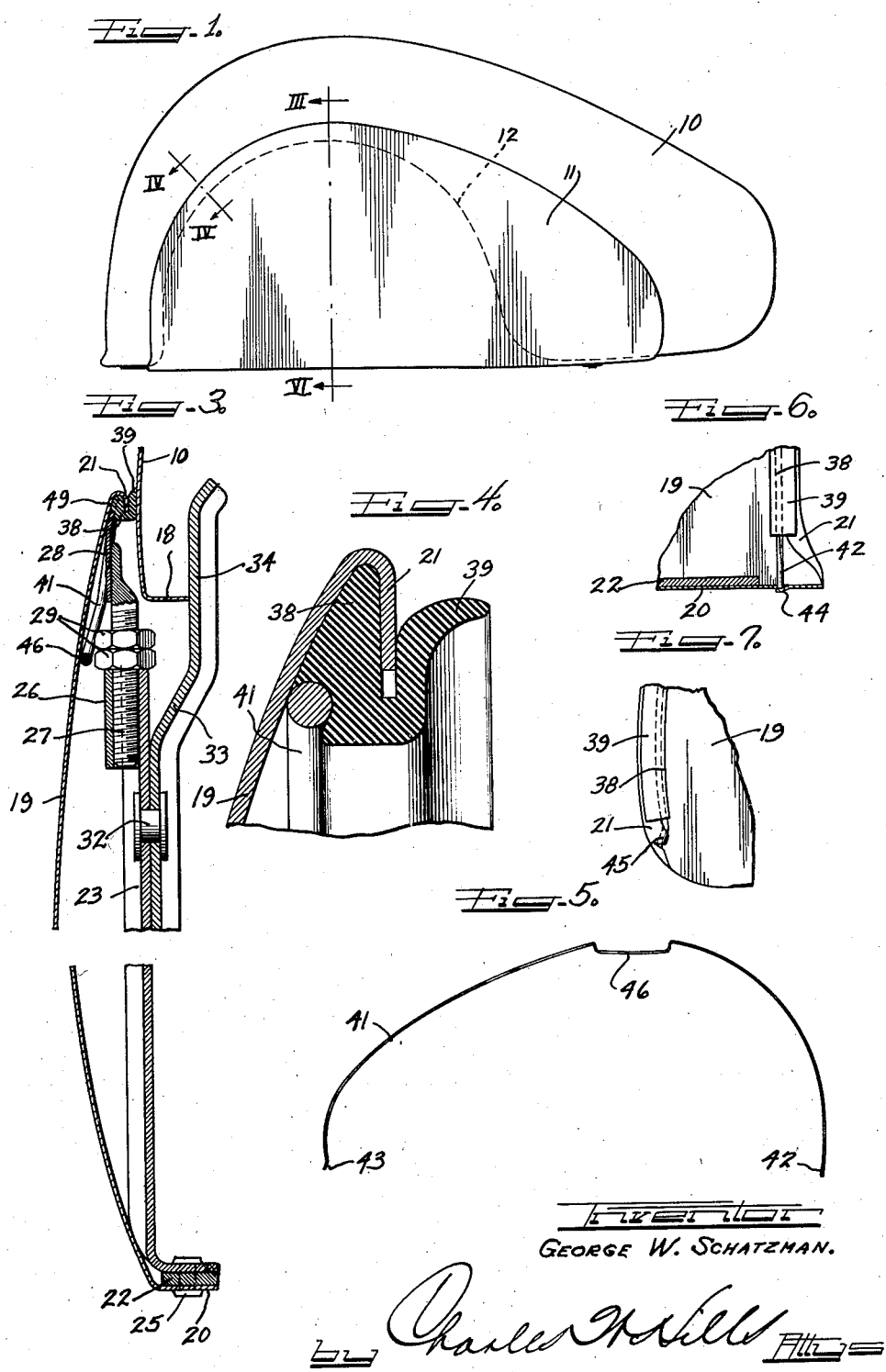
GEORGE W. SCHATZMAN.

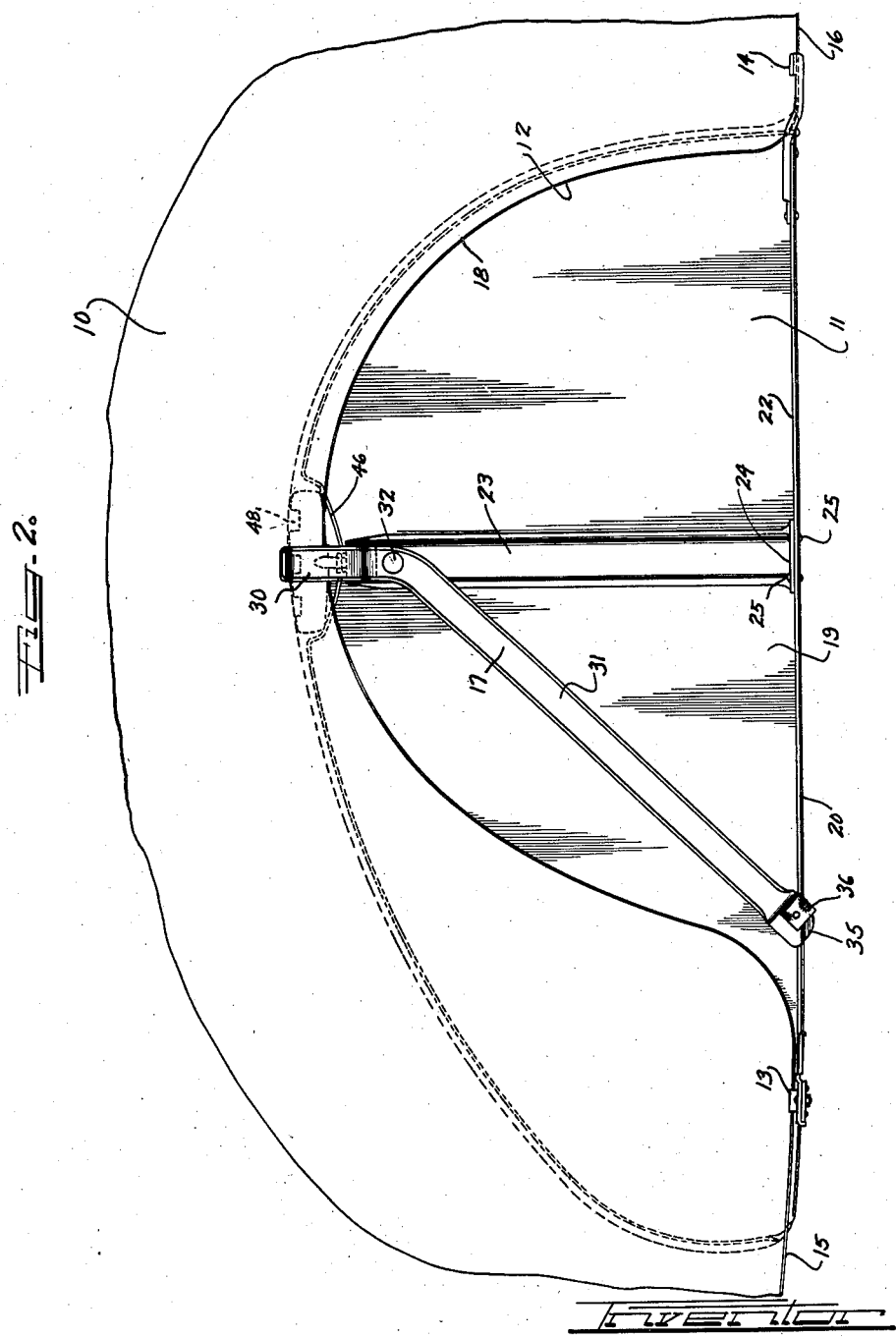

July 22, 1941.　　G. W. SCHATZMAN　　2,250,136
FENDER SHIELD
Filed April 24, 1939　　3 Sheets-Sheet 3
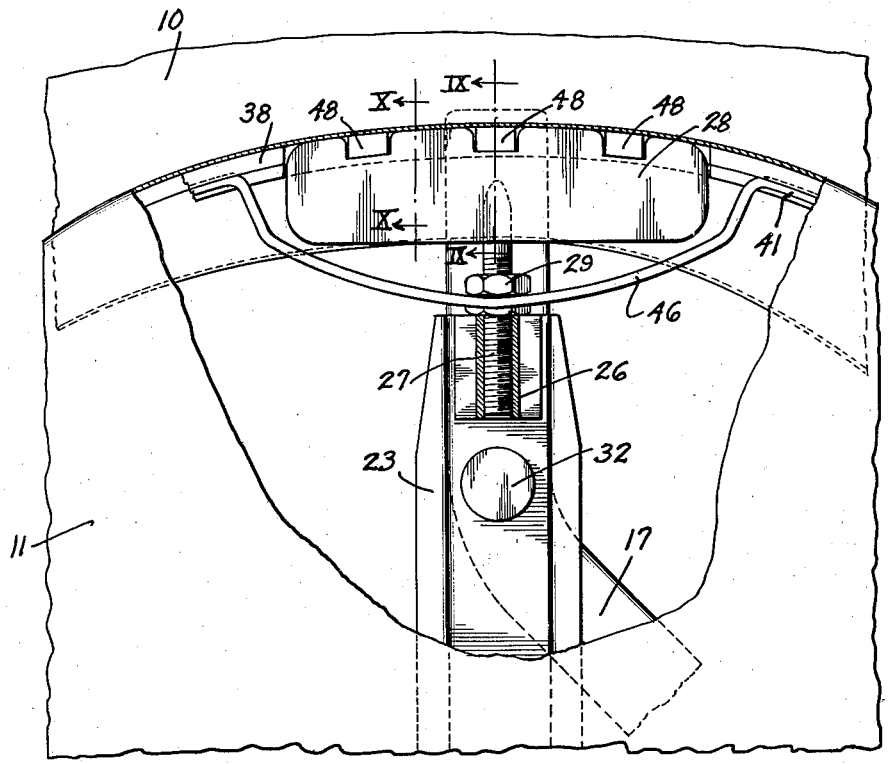
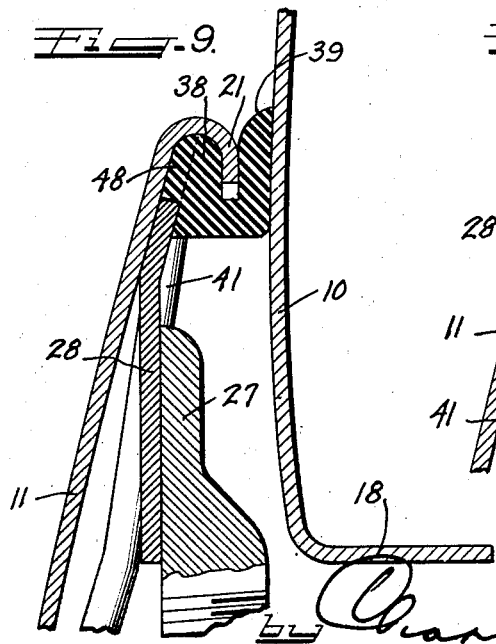
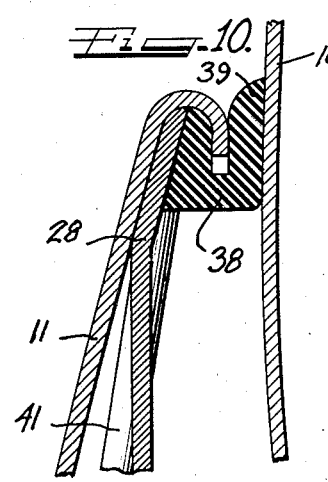
George W. Schatzman.

Patented July 22, 1941

2,250,136

UNITED STATES PATENT OFFICE 2,250,136

FENDER SHIELD

George W. Schatzman, Detroit, Mich., assignor to Houdaille-Hershey Corporation, Detroit, Mich., a corporation of Michigan Application April 24, 1939, Serial No. 269,651

8 Claims. (Cl. 280—153)

This invention relates to fender shield and fender shield assemblies, and more particularly to a novel cushioning strip which extends around the curved edge of the fender shield for contact with the fender and to a means for securing the cushioning strip on the fender shield.

In the vehicle industry, and particularly in the automobile industry, various means have been utilized to improve the appearance of vehicle fenders. The usual vehicle fender is provided with an opening which affords access to the vehicle wheel, and which permits the ready removal of the wheel in an axial direction. Since this opening inherently presents an ugly outward appearance, detachable fender shields have been employed to substantially cover this opening. As the term "fender shield" shall hereinafter be employed, it refers to any member which is adapted to be secured to a fender or other portion of a vehicle body for the purpose of covering the opening in the fender of a vehicle body which is provided for access to or removal of a vehicle wheel. Furthermore, as the term "fender" shall hereinafter be employed, it refers to any form of wheel fender in its broad sense, whether such fender be separate from the vehicle body part, partially separate from the vehicle body, or actually an integral part of the vehicle body whether or not it projects outwardly away from the principal body portion of the vehicle or not.

It is an object of the present invention to provide a fender shield of novel construction and characteristics.

It is a further object of this invention to provide a novel fender shield which is economical to manufacture and which is rugged and reliable in use.

It is a still further object of this invention to provide a novel cushioning strip for vehicle fender shields and to novel means for securing the same thereon.

Another and still further object of this invention is to provide a fender shield having a cushioning strip extending around the curved edge thereof, and which is secured thereto by a wire under compression, as distinguished from being held on by a wire under tension.

A further object of this invention is to provide a cushioning strip having a novel cross sectional configuration and which permits it to be mounted on a fender shield in a novel manner and which cooperates with the fender in a fender and fender shield assembly in a novel manner.

The novel features which I believe to be characteristic of my invention are set forth with particularity in the appended claims. My invention itself, however, both as to its organization and manner of construction, together with further objects and advantages thereof, may best be understood by reference to the following description taken in connection with the accompanying drawings, in which:

Figure 1 is a front elevational view of a vehicle fender and fender shield assembly;

Figure 2 is a rear elevational view of the fender and fender shield assembly shown in Figure 1;

Figure 3 is a cross sectional view of the fender and fender shield assembly taken along the line III—III of Figure 1;

Figure 4 is an enlarged fragmentary sectional view of the upper curved edge of the fender shield and of the cushioning strip mounted thereon, taken along the line IV—IV of Figure 1;

Figure 5 is a diagrammatic view of the compression wire which holds the cushioning strip on the fender shield, its shape being shown as it exists in its unmounted position;

Figure 6 is a rear view of the lower leading corner of the fender shield with the supporting arm removed to show the manner in which the wire is held on the fender shield at that point;

Figure 7 is a rear view of the lower trailing corner of the fender shield showing the manner in which the wire of Figure 5 is secured to the fender shield at that point.

Figure 8 is an enlarged fragmentary rear view of the upper portion of the strut assembly of the fender shield;

Figure 9 is a greatly enlarged fragmentary sectional view taken along the line IX—IX of Figure 8; and Figure 10 is a view similar to Figure 9 but taken along the section line X—X of Figure 8.

Referring now to the various figures of the drawings which illustrate the preferred embodiment of the present invention, there is illustrated therein a vehicle fender 10 having a fender shield 11 mounted thereon over the wheel access opening 12 in the outer depending side wall of the fender 10. While the fender 10 may assume a wide variety of shapes without departing from the spirit and scope of the present invention, and may, indeed, be formed integral or made a part of the vehicle body itself (not shown), the fender 10 has been illustrated as being of the usual high crown type commonly employed on motor vehicles of the present day.

The fender shield 11 is detachably mounted on the vehicle fender 10 and is positioned to cover the relatively large opening in the outer side wall of the fender 10 which is conventionally provided in substantially all vehicle fenders to permit access to and removal of the vehicle wheel therethrough. The fender shield 11 may be secured to the fender 10 in any of a wide variety of manners. One convenient method for detachably supporting and securing the fender shield 11 to the fender 10 is to provide hook arms 13 and 14 at the two lower corners of the fender shield 11 which will extend around the underturned base edges 15 and 16 of the fender 10, and to provide a latching arm 17 at the top of the fender shield 11 which will extend through the fender opening 12 into engagement with the inturned edge 18 which defines the opening 12 in the fender 10.

As may be seen best in Figures 2 and 3, the fender shield 11 comprises a panel portion 19 which is provided with a rearwardly bent base flange 20 and a curled peripheral edge portion 21 around its curved edge. The base flange 20 is preferably reinforced by a flat bar 22 which is secured thereto and which lies along the upper surface thereof.

To further reinforce the fender shield 11, a brace bar 23 extends upwardly behind the panel portion 19 from the lower edge thereof to a point in proximity to the top. This brace bar 23 has a base portion 24 which is seated on the horizontal reinforcing bar 22 carired on the base flange 20 of the fender shield 11 and which is riveted or otherwise suitably secured thereto as at 25. In order that the brace bar 23 may possess sufficient rigidity without an undue amount of metal being formed therein, the brace bar 23 is preferably channel-shape in cross section. The top end of the brace bar 23 is provided with a collar 26 which is arranged to receive a threaded stud 27 carried by a plate member 28 which extends up into and against the curled edge portion 21 of the fender shield 11. A pair of nuts 29 are threaded on to the stud 27 and tightened against the collar 26 to force the plate 28 up tight against the curled edge 21. The novel features of this brace bar and the manner in which it is secured to the fender shield 11 are described in detail and claimed in my co-pending application entitled Adjustable fender shield, Serial No. 293,013, filed September 1, 1939, and assigned to the same assignee as the present invention.

The latching arm 17 includes a short leg portion 30 and a relatively long leg portion 31 which is disposed at an angle with respect to the short leg portion 30. The latching arm 17 may be conveniently mounted on the fender shield by a mounting stud or rivet 32 carried by the upright brace bar 23. The short leg portion 30 of the latching arm 17 is bent obliquely rearwardly as at 33 and then outwardly as at 34, so as to engage the rearwardly bent flange 18 of the fender 10. The long leg portion 31 of the latching arm 17 extends downwardly to the flange 20 and the bar 22 along the bottom of the panel 19, and its end 35 is bent to rest on top of the bar 22 and to extend around under the flange 20 as described in detail in my co-pending application referred to above. A piece of thick fabric 36 is wrapped partially around and riveted to the end 35 of the arm 17 where it engages the flange 20 and bar 22 to prevent squeaking or other noise. To operate the latching arm or lever 17, it is merely necessary to spring its end 35 back out of engagement with the flange 20 and bar 22 and to swing it down and forward.

The principal feature of the present invention is the novel rubber edging 38 which prevents metal-to-metal contact between the edge 21 of the fender shield panel 19 and the side of the fender 10. The edging 38 is a strip of rubber having the cross section shown in Fig. 4. Its main portion fits up between the curled panel edge 21 and the body of the panel 19 and carries a lip 39 which lies on the outside of the in-folded panel edge 21. When it is free, the lip 39 curls out away from the panel edge 21 as shown in Fig. 4 but flattens out between the panel edge 21 and the side of the fender 10 when the fender shield is in place, as shown in Fig. 3. This provides for any small irregularities which may exist in the surface of the fender and insures that a good seal will be made all around.

The edging 38 is held in place under the panel edge 21 chiefly by a stiff resilient wire 41 which fits into a rabbet or groove along the corner of the edging 38 which is next to the panel 19 and nearest the center of the panel. Both ends 42 and 43 of the wire 41 extend beyond the ends of the edging 38 and engage the panel in such a manner as to be prevented from moving endwise, one end 42 fitting down into a small socket 44 stamped in the base flange 20 as shown in Fig. 6 and the other end 43 fitting into a pocket formed by pinching in a portion 45 of the infolded panel edge 21 as shown in Fig. 7.

The wire 41 is under endwise compression and acts somewhat like an arch in exerting an upward and outward pressure against the rubber edging 38 along almost its entire length. In order to resiliently maintain this pressure and also to facilitate the assembly of the wire with the panel, a short portion near the center of the wire is offset downwardly out of line with the adjacent portions of the wire, as shown in Fig. 5, forming a bow 46. The wire 41 is made so that its length, measure along the curve from one end 42 to the bow 46, across the bow 46 and along the curve to the other end 43 is slightly greater before the wire is put into place than the distance from the socket 44 for one end 42 of the wire, around the groove in which the wire is to fit to the pocket 45 for the other end 43 of the wire. Then, when the wire 41 is in place, the bow 46 will be flexed, as shown in Fig. 2, to make the distance across it less than before and to make the total length of the wire, measured as above, equal to the length of the space where the wire fits. The tendency of the bow 46 to straighten out keeps the wire 41 under endwise compression and pressing tightly against the underside of the edging 38. The infolded panel edge 21 holds the edging 38 against the pressure of the wire 41 and the edging in turn holds the wire 41 against the back of the panel 19. Thus all the parts are held tightly in place.

The bow 46 in the wire 41 leaves a small section of the edging 38 unsupported by the wire 41. This section is supported by the plate or shoe 28 at the upper end of the brace bar or stay 23, the plate 28 being formed with notches 48 which receive lugs 49 on the side of the edging (see Figures 8, 9 and 10). The bow 46 also allows the plate 28 to fit up against the back of the panel 19 where it engages the panel edge 21 and the edging 38 so that only the side of the edging 38 need be cut away to provide room for the plate 28, this cutting away being done so as to leave the lugs 49 which fit in the notches 48 on the edge of the plate 28.

While I have shown particular embodiments of my invention, it will, of course, be understood that I do not wish to be limited thereto, since many modifications may be made, and I therefore contemplate by the appended claims to cover all such modifications as fall within the true spirit and scope of my invention.

I claim as my invention:

1. In a fender shield comprising a panel having an inturned edge around a portion of the periphery thereof, an edging formed of relatively soft material, said edging having an anchoring portion fitting between said inturned edge and the body of said panel and being formed to provide shoulders facing towards the body of said panel and the center of said panel, and means bearing against the shoulder that faces towards the center of said panel for holding said anchoring portion under said inturned panel edge, said means fitting between said panel body and the shoulder that faces towards said panel body.

2. In a fender shield comprising a panel having a peripheral centrally-facing groove on the back, an edging having a base portion fitting into said groove, and means engageable with an exterior surface of said edging for resiliently pressing said base portion radially outwardly away from the center of said panel.

3. In a fender shield comprising a panel having a peripheral centrally-facing longitudinally-concave groove on the back, an edging having a base portion with one side fitting into said groove, and a wire extending exteriorly along the other side of said base portion, said wire being mounted on said shield under a longitudinal compressive force which tends to expand said wire against said base portion of said edging, whereby said edging is snugly held in said groove.

4. In a fender shield comprising a panel having a peripheral centrally-facing longitudinally-concave groove on the back, an edging having a base portion with one side fitting into said groove, a wire extending along the other side of said base portion, and resilient means for exerting a longitudinal compressive force on said wire, said means comprising a portion of said wire bowed away from said edging.

5. In a fender shield comprising a panel having a flange along the lower edge and an upper edge curving down to said lower edge, means providing a centrally-facing longitudinally-concave groove on the back of said panel along said upper edge, an edging having an anchoring portion fitting in said groove, a wire extending along said edging and pressing said edging anchoring portion into said groove, and means for holding said wire including a socket in said flange for receiving one end of said wire.

6. In a fender shield comprising a panel having an inturned edge forming a longitudinally concave groove, an edging having an anchoring portion fitting in said groove, and a wire extending along said edging and pressing said edging anchoring portion into said groove, one end of said wire extending past the end of said edging and fitting into a pocket formed by a portion of said flange being pinched in against the back of said panel whereby said end of said wire is held against longitudinal movement.

7. In a fender shield comprising a panel having an inturned edge around a portion of the periphery thereof, an edging formed of relatively soft material, said edging having a base portion fitting between said inturned edge and the body of said panel and a lip portion overlying said inturned edge and then flaring away therefrom, and means for holding said base portion in place, said means including a resilient support which tends to expand radially outwardly secured to one edge of said panel and extending across the back thereof and engaging an exterior surface of said edging.

8. In a fender shield comprising a panel having an inturned edge around a portion of the periphery thereof, an edging formed of relatively soft material, said edging having a base portion fitting between said inturned edge and the body of said panel and a lip portion overlying said inturned edge, said base portion having grooves extending thereacross and defining projecting lugs therebetween, and means for holding said base portion in place, said means including a support secured to one edge of said panel and extending across the back thereof under said inturned edge, the portion of said support extending under said inturned edge having fingers projecting along said grooves and bearing against said panel, and said lugs being engaged in between said fingers.

GEORGE W. SCHATZMAN.